United States Patent [19]

Sunagawa et al.

[11] Patent Number: 5,436,991
[45] Date of Patent: Jul. 25, 1995

[54] OPTICAL WAVEGUIDE DEVICE

[75] Inventors: Hiroshi Sunagawa; Takashi Yamada; Hideo Miura, all of Kanagawa, Japan

[73] Assignee: Fuji Photo Film Co., Ltd., Kanagawa, Japan

[21] Appl. No.: 284,283

[22] Filed: Aug. 2, 1994

Related U.S. Application Data

[63] Continuation-in-part of Ser. No. 5,448, Jan. 19, 1993, abandoned.

[30] Foreign Application Priority Data

Jan. 11, 1992 [JP] Japan ................... 4-006393

[51] Int. Cl.⁶ .............................. G02B 6/34
[52] U.S. Cl. ........................ 385/37; 385/14; 385/31; 359/569
[58] Field of Search ............ 385/37, 14, 31, 39; 359/569, 576, 562

[56] References Cited

U.S. PATENT DOCUMENTS

| | | | |
|---|---|---|---|
| 4,691,982 | 9/1987 | Nishimura et al. | 385/37 |
| 4,730,330 | 3/1988 | Plihal et al. | 385/37 X |
| 4,887,255 | 12/1989 | Handa et al. | 385/31 X |
| 5,081,615 | 1/1992 | Sunagawa | 385/37 X |
| 5,101,459 | 3/1992 | Sunagawa | 385/37 |

FOREIGN PATENT DOCUMENTS

| | | | |
|---|---|---|---|
| 0198006 | 11/1983 | Japan | 359/576 |
| 0086307 | 4/1987 | Japan | 385/37 |
| 0213807 | 8/1990 | Japan | 385/37 |

OTHER PUBLICATIONS

"Efficiency of Optical-Grating Couplers", R. Ulrich, Optical Society of America, vol. 3, No. 11, pp. 1419-1431. 26 Jan., 1973.

*Primary Examiner*—Rodney B. Bovernick
*Assistant Examiner*—Hemang Sanghavi
*Attorney, Agent, or Firm*—Sughrue, Mion, Zinn, Macpeak & Seas

[57] ABSTRACT

An optical waveguide device for coupling an external wave with a guided wave by means of a grating coupler formed on an optical waveguide device which lies on a substrate. The grating coupler is further coated with a cladding layer. An external wave is transformed into a guided wave after being diffracted by a first grating coupler, and travels along the waveguide to a second grating coupler. The guided wave is then subjected to diffraction by means of the second grating coupler, whereupon a minus first-order wave is diffracted only toward the substrate, whilst other waves of higher order are respectively diffracted toward the cladding layer and the substrate. The wave diffracted toward the cladding layer is totally reflected from a cladding layer boundary furtherst from the substrate, thereby passing through the substrate. The diffracted wave thus reflected interferes with the other wave of the same order diffracted to the substrate, thereby weakening each other.

10 Claims, 9 Drawing Sheets

OPTICAL WAVEGUIDE DEVICE

This is a continuation-in-part of application Ser. No. 08/005,448 filed Jan. 19, 1993, now abandoned.

BACKGROUND OF THE INVENTION

1. Field of the Invention

This invention relates to an optical waveguide device, and more particularly to an optical waveguide device with diffraction gratings, which are arranged in such a manner that a guided wave, after being diffracted by the gratings, exits from the optical waveguide.

Moreover, the present invention relates to an optical waveguide device with diffraction gratings, which are arranged in such a manner that an external wave of light, after being diffracted by the gratings, enters the optical waveguide device.

2. Description of the Prior Art

Heretofore, there have already been proposed several types of optical waveguide devices in which a wave travels in a guided mode along an optical waveguide laid on a substrate. In such a type of optical waveguide device, grating couplers, formed on the surface of the optical waveguide, are commonly employed in causing a guided wave to be emitted from the optical waveguide, or an external wave to be introduced into the optical waveguide.

The grating couplers are advantageous in that an incoming or an outgoing wave tends to suffer less deterioration in optical quality and to be stable when it enters, or is emitted from, the optical waveguide. However, it is also well admitted that this type of grating couplers have drawbacks such as a low entrance/emission efficiency of the wave, and that the variation of the efficiency is sensitively dependent on errors in the dimensions of the grating couplers, that is, errors in the ratio of pitch to line width.

In order to improve the entrance/emission efficiency of the wave, attempts have been made to effectively reduce the number of coupled beams in the grating coupler. Examples of such attempts include the arrangment shown in the Journal of the Optical Society of America Vol. 63, No. 11, pp. 1419-1431. In this arrangement, grating couplers are formed on the surface of an optical waveguide, which surface is located on the substrate side, on a transparent substrate. With these grating couplers, a guided wave is diffracted into the air side and the substrate side, and the wave of a minus-first order diffracted toward the substrate is reflected from the reflecting layer on the surfaces of the substrate. Thus, the reflected wave interferes with the minus-first order wave diffracted to the air side, thereby intensifying each other. This arrangement, which principally effects the coupling of two beams, prevents the distribution of an optical power into two directions: the substrate side and the air side, because the waves effectually exit only to the air side, thereby realizing high coupling efficiencies.

However, this arrangement requires extremely strict conditions in coupling the two beams in order to obtain considerably high coupling efficiencies, which in turn require grating couplers of submicrons or less in width, and which render the aspect ratio of the grating coupler difficult to control. Therefore, the grating coupler of this type is very difficult to manufacture.

The above-mentioned literature also relates to the fact that a minus-second order wave, as well as a minus-first order wave, are diffracted into both the substrate and the air. Particularly, this literature discloses the arrangement in which the minus-first order wave diffracted to the substrate is reflected from the reflecting layer on the surface of the substrate to interfere with the minus-first order diffracted wave directed to the air in such a manner as to intensity each other, and in which the minus-second order wave diffracted to the substrate is reflected from the reflecting layer on the surface of the substrate to interfere with the minus-second order wave oriented to the air so as to weaken each other. This arrangement will be inferior in efficiency due to the coupling of four beams without the reflecting layer, but can lead to high coupling efficiencies when the reflecting layer is employed because the distribution of the optical power to the minus-first order diffracted wave is effectually improved by means of the reflecting layer.

This arrangement results in the pitches of the grating couplers being less smaller, but the resultant pitches are still not more than 1 $\mu$m, which renders the fabrication of the grating couplers difficult. Moreover, even with this arrangement, the precise regulation of the aspect ratio is difficult to practice, thereby rendering the control of the coupling length between the grating couplers and the optical waveguide difficult: that is, entailing differences in the diameter of an outgoing beam and input efficiencies.

Another example is disclosed in U.S. Pat. No. 4,691,982. In this example, grating couplers are formed on the surface of an optical waveguide laid on a transparent substrate: that is, the surface of the optical waveguide being much closer to the air side. In addition, a cladding layer (a buffer layer) is further provided over the grating couplers. The cladding layer is then covered with a relecting lyaer.

With this structure, a wave diffracted by the grating coupler toward the substrate interferes with a wave which is first diffracted toward the cladding layer and is subsequently reflected from a boundary, between the cladding layer and the reflecting layer, back to the substrate, thereby intensifying each other, and then the resultant wave emerges from the substrate.

This arrangement, however, probably fails to achieve the high efficiency because it lacks a definite number of beams, to be coupled with a guided wave, and the specific order of diffracted waves being used.

SUMMARY OF THE INVENTION

In view of the foregoing observations and description, a primary object of this invention is to provide an optical waveguide device with a high efficiency, which is sufficient to couple a guided wave and an external wave and which undergoes less variations dependent on errors in the line width of the grating couplers, and an optical waveguide device easy to manufacture as well.

Another object of this invention is to provide an optical waveguide device which requires a less restrictive manufacturing accuracy.

To these ends, according to one aspect of this invention, there is provided an optical waveguide device, including a diffraction grating means formed on an optical waveguide which is laid over a transparent substrate, and a cladding layer, being disposed on the diffraction grating means, wherein the optical waveguide, the cladding layer, and the diffraction grating means are arranged in such a manner that a minus first-order wave is diffracted only toward the substrate, while other waves of higher order, which are larger in absolute value than that of the minus first-order wave, are diffracted both toward the substrate and toward the cladding layer, and in such a manner that at least one of the diffracted higher order waves, which is first diffracted toward the cladding layer and is subsequently reflected back to the substrate from a cladding layer boundary furtherst from the substrate, weakens the other diffracted wave of the same order that is initially diffracted to the substrate.

According to another aspect of this invention, there is an optical waveguide device including the optical waveguide as defined above, wherein the optical waveguide is arranged in such a manner that if an external wave is reversed in direction, the external wave traces the same optical path as does a minus-first order wave diffracted only toward the substrate, and that the external wave is introduced into the optical waveguide after being diffracted by the diffraction grating means.

In the optical waveguide device according to the first preferred mode of this invention, a minus first-order diffracted wave, which has the largest power distribution ratio, travels only in one direction, that is, only toward the substrate. Other unwanted higher order diffracted waves cancel each other and are suppressed. The number of coupled waves are, therefore, effectively reduced, and the minus first-order wave is remarkably enhanced in power distribution ratio, thereby improving the coupling efficiency. Thus, as is evident from the reciprocity theorem, the high coupling efficiency is assured even in the optical waveguide device according to a second preferred mode.

Among high order diffracted waves, such as a minus second-order, a minus third-order, a minus fourth-order diffracted wave . . . , the second-order and third-order diffracted waves have particularly high power distribution ratios. In order to obtain a more distinguishable effect of the foregoing improved coupling efficiency, it is desirable that the minus second-order waves, diffracted both toward the cladding layer and toward the substrate, weaken each other, and/or that the likewise minus third-order waves abate each other. Most preferably, both the second-order diffracted waves and the third-order diffracted waves cancel each other, respectively.

As mentioned above, the optical waveguide device has a drawback in that the coupling efficiency between the external wave and the guided wave is sensitively dependent on the pitch-to-line width ratio. This is ascribed to a reduction in the diffraction efficiency of the minus first-order diffracted wave, which is caused by the fact that the diffraction efficiency of diffracted waves with a higher even order, such as a minus second-order or a minus fourth-order wave, is increased with an increase in errors between the actual pitch-to-line width ratio and a design ratio.

To obviate such a drawback, the optical waveguide device embodying the present invention is arranged to suppress high, even-order diffracted waves, thereby reducing the principle dependence of diffraction efficiency of the minus first-order diffracted wave on the diffraction efficiency of the higher order diffracted waves. Such an arrangement can suppress a drop in the diffraction efficiency of the minus first-order refracted wave to a much smaller extent, even when the actual pitch-to-line width ratio of the diffraction grating means is different from a design ratio.

In practice, in the case of the optical waveguide device, according to a first preferred mode of this invention, the grating means are ruled at a relatively coarse pitch so as to couple a plurality of beams with one another. Since the optical waveguide device of this invention does not require such strict conditions as are needed in coupling two beams with each other, it renders the diffraction grating means easy to manufacture. This is also true of the optical waveguide device according to the second preferred mode of this invention.

DESCRIPTION OF THE PREFERRED EMBODIMENTS

Referring to the accompanying drawings, an optical waveguide device according to this invention will be described in detail hereinbelow.

Figure 1:
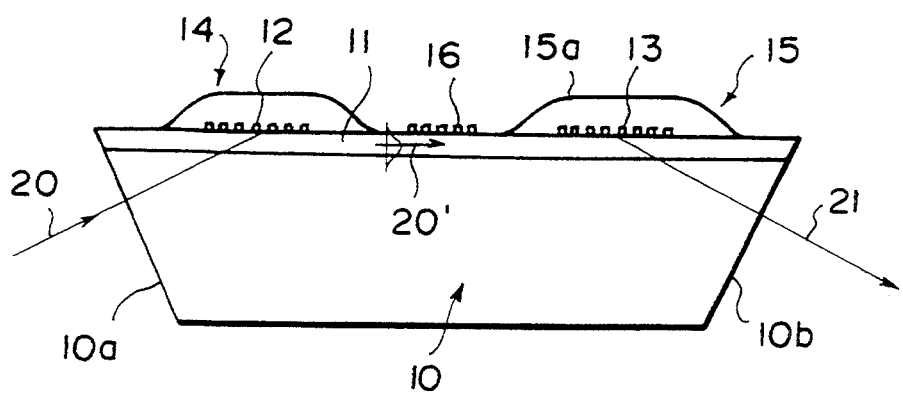
FIG. 1 is a schematic side view showing an optical waveguide device according to a first embodiment of this invention.
Figure 2:
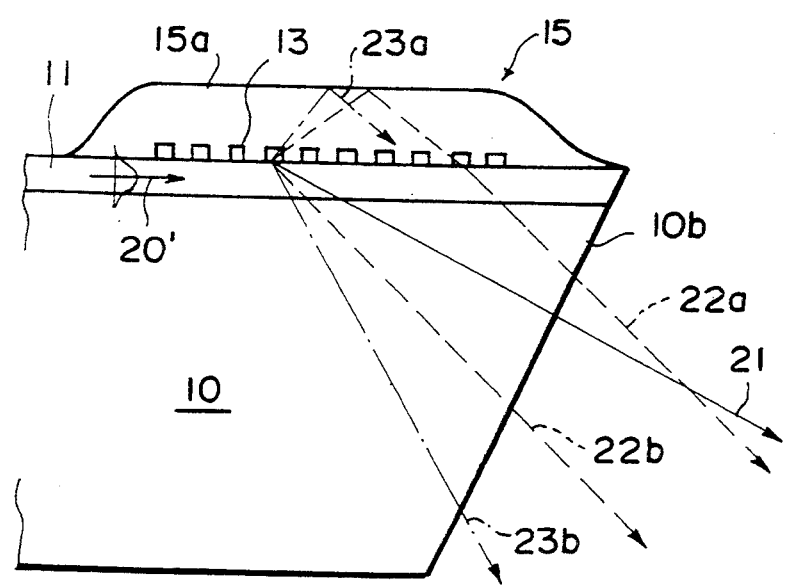
FIG. 2 is an enlarged side view showing a chief portion of the optical waveguide device shown in FIG. 1.

FIG. 1 illustrates an optical waveguide device embodying the present invention; and FIG. 2, an enlarged view of the grating coupler for use in emitting a wave. According to one preferred mode, the optical waveguide device constitutes an electro-optical switch (EO switch). A thin-film optical waveguide 11, produced by the exchange of protons, is laid over a substrate 10 which is composed of LiNbO₃. Over this optical waveguide are ruled linear grating couplers (hereinafter referred to as LGC) 12 for introducing an external wave and LGCs 13 for emitting a wave; the LGCs 12 are coated with a cladding layer 14 whilst the LGCs 13 are coated with a cladding layer 15. Electro-optical gratings 16 are further formed on the optical waveguide 11 between the LGCs 12 and the LGCs 13 for controlling the emission of waves from the LGCs 13 by switching the optical path of a guided wave.

The foregoing LGCs 12 and LGCs 13 are formed by the steps of: firstly producing a film of ZnSe, using the RF sputtering technique, over the resist pattern which is previously defined by the electron beam plotting technique; and secondly lifting off the ZnSe film.

The cladding layers 14 and 15 are produced by coating the LGCs 12 and the LGCs 13, respectively, with a film of HfO₂ (Hafnium Oxide) at a predetermined thickness by means of the RF sputtering technique. The substrate 10 is, at one end 10a thereof, abrasively finished, at an angle of 65 degrees with respect to the lateral axis, to introduce an external wave, that is, a He-Ne laser beam 20 and, at the other end 10b, is abrasively finished, at the same angle in such a fashion as is symmetrical with the other end, to emit the wave after being diffracted by the LGCs 13 out of the substrate 10.

The external wave 20 enters the substrate 10 through the end surface 10a. Then, it travels further to one of the LGCs 12 after passing through the optical waveguide 11. In this LGC 12, the wave is diffracted, as a guided wave 20', to travel along the optical waveguide 11. The LGC 12 will be described later herein.

The guided wave 20', which travels to the right in FIGS. 1 and 2 in a guided mode, is subjected to the diffraction at one of the LGCs 13, thereby being diffracted into two directions: that is, toward the substrate and the cladding layer; the one passing through the substrate 10, and the other passing through the cladding layer 15. In this embodiment, the effective refractive index N of the optical waveguide 11, the refractive index $n_c$ of the cladding layer 15, and the pitch $\Lambda$ of the LGCs 13 are determined such that a minus first-order wave 21 can be diffracted only toward the substrate 10 at the LGC 13, and such that other diffracted waves of higher orders, which are larger in absolute value than the minus first-order wave, such as a minus second-order wave, a minus third-order wave, a minus fourth-order wave, etc., are diffracted toward the substrate 10 and the cladding layer 15. While FIG. 1 illustrates only the minus first-order diffracted wave 21, FIG. 2 shows the minus second-order diffracted waves 22a and 22b and the minus third-order diffracted waves 23a and 23b, as well as the minus first-order diffracted wave 21.

The following represents conditions designed to diffract the guided wave 20' in such a fashion as was previously mentioned. Supposing that the wavelength (in a vacuum) of a guided wave 20' is denoted with $\lambda$, conditions necessary to emit the minus first-order diffracted wave 21 only towards the substrate 10 are $$n_c < N - \lambda/\Lambda.$$

Meanwhile, conditions to diffract the minus second-order wave toward the substrate 10 and the cladding layer 15 are $$N - 2\lambda/\Lambda < n_c.$$

In addition to the minus second-order wave, the latter conditions are also applicable for all other waves of higher order such as a minus third-order wave, a minus fourth-order wave, etc. As with the minus second-order wave, under the latter conditions, all waves of higher order are diffracted toward the substrate 10 and the cladding layer 15. Hence, conditions necessary for diffracting the guided wave 20', in same manner as set forth above, toward the substrate and the cladding layer will be defined as $$N - 2\lambda/\Lambda < n_c < N - \lambda/\Lambda \tag{1}$$

The minus second-order wave 22a, diffracted by the LGC 13 toward the cladding layer 15, is totally reflected from a boundary surface 15a between the cladding layer 15 and the air. In the optical waveguide device embodying the present invention, the minus second-order wave 22a, thus reflected from the boundary surface, interferes with the other minus second-order wave 22b diffracted by the LGC 13 directly toward the substrate 10, thereby mitigating each other.

Likewise, the minus third-order wave 23a, which is first diffracted toward the cladding layer 15 and then totally reflected from the boundary surface 15a, interferes with the other minus third-order wave 23b directly diffracted toward the substrate 10, thereby abating each other.

Explanations will now be given of conditions necessary for suppressing the minus second-order diffracted wave and the minus third-order diffracted wave in the manner as set forth above.

Conditions for suppressing the minus second-order diffracted wave will firstly be explained. Supposing that the guided wave 20' travels along the optical waveguide 11 in a TE mode. Given that the diffraction angle of the minus second-order wave 22a, diffracted to the cladding layer, is denoted with $\theta_{c2}$, and that the diffraction angle of the minus second-order wave 22b, diffracted to the substrate, is denoted with $\theta_{s2}$, a difference in the quantity of phase advancement between the minus second-order diffracted wave 22a and the minus second-order diffracted wave 22b is obtained. The quantity of phase advancement $\phi_A$ of the minus second-order diffracted wave 22a, which is first diffracted toward the cladding layer 15 and then reflected from the boundary surface 15a toward the substrate 10, is given as $$\phi_A = 2n_c k t_c / \cos\theta_{c2} + n_f k t_f / \cos\theta_{f2} - 2\phi_g$$

where,
  $n_c$: the refractive index of the cladding layer 15
  $t_c$: the thickness of the cladding layer 15
  $n_f$: the refractive index of the optical waveguide 11
  $t_f$: the thickness of the optical waveguide 11
  $\theta_{f2}$: the angle at which the minus second-order wave 22a is diffracted by the LGC 13 in the optical waveguide
  $k = 2\pi/\lambda$
  $\phi_g$: Goos-Hänchen shift when the minus second-order wave is totally reflected from the boundary surface 15a.

Here, $$\tan\phi_g = \sqrt{(n_c \sin\theta_{c2})^2 - 1} / n_c \cos\theta_{c2}.$$

Meanwhile, the quantity $\phi_B$ of phase advancement of the minus second-order wave 22b diffracted directly to the substrate 10 is given by $$\phi_B = 2 n_c k t_c \sin^2\theta_{c2}/\cos\theta_{c2} + n_f k t_f/\cos\theta_{f2}.$$

The phase difference between the minus second-order wave 22a, passing through the substrate 10 after being totally reflected from the boundary surface, and the minus second-order wave 22b suppress each other under the condition of $(2m+1)\pi$. Hence, the phase difference is expressed as $$\phi_A - \phi_B = (2m+1)\pi \text{ [m designates an integer]}$$

Accordingly, the conditions for suppressing the minus second-order wave will be obtained as $$2 n_c k t_c \cos\theta_{c2} - 2\phi_g = (2m+1)\pi \quad (2)$$

As with the minus second-order diffracted wave, conditions for suppressing the minus third-order wave will be $$2 n_c k t_c \cos\theta_{c3} - 2\phi_g' = (2m'+1)\pi \quad (3)$$

Here, $\phi_g'$ designates the Goos-Hänchen shift of the minus third-order diffracted wave. Hence, $$\tan\phi_g' = \sqrt{(n_c \sin\theta_{c3})^2 - 1} / n_c \cos\theta_{c3}$$

where m' designates an integer; and $\theta_{c3}$, the diffraction angle of the minus third-order wave 23a diffracted to the cladding layer.

The effective refractive index N of the optical waveguide 11, the refractive index $n_c$ and the thickness $t_c$ of the cladding layer 15, and the pitch $\Lambda$ of the LGC 13 are determined so as to satisfy the conditions (1), (2) and (3) with respect to the external wave 20 at a wavelength of $\lambda$, whereupon the minus second-order diffracted wave and the minus third-order diffracted wave are suppressed. As a result of this, the power distribution ratio, or the diffraction efficiency, of the minus first-order diffracted wave 21 can be improved.

Specific data of the embodiment are as follows:

TABLE 1

| | |
|---|---|
| Optical Wavelength $\lambda$ | 632.8 nm |
| Refractive index $n_s$ of substrate | 2.1938 |
| Refractive index $n_f$ of optical waveguide | 2.2100 |
| Thickness $t_f$ of optical waveguide | 1.00 μm |
| Effective refractive index N of optical waveguide | 2.2006 |

The distribution pattern of refractive indices of the optical waveguide approximates a stepped pattern. According to the equation (1), we obtain $$\lambda/(N - n_c) < \Lambda < 2\lambda/(N - n_c) \quad (4)$$

Based on the conditions for the total reflection of the minus third-order wave 23a from the boundary surface 15a (eventually, the minus second-order diffracted wave 22a makes a total reflection under these conditions), we have $$3\lambda/(N-1) < \Lambda \quad (5)$$

Figure 3:
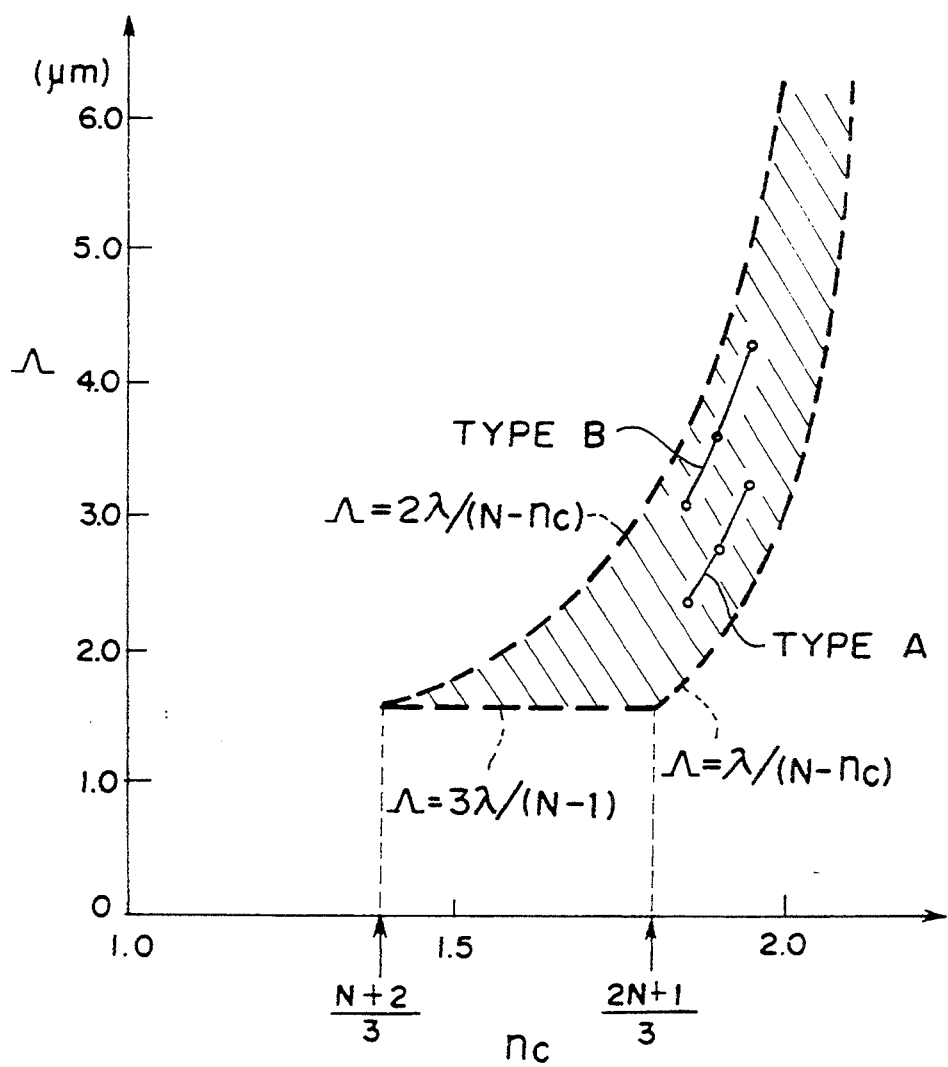
FIG. 3 illustrates characteristic curves illustrating the range of a high coupling efficiency of the optical waveguide device shown in FIG. 1.
Figure 4:
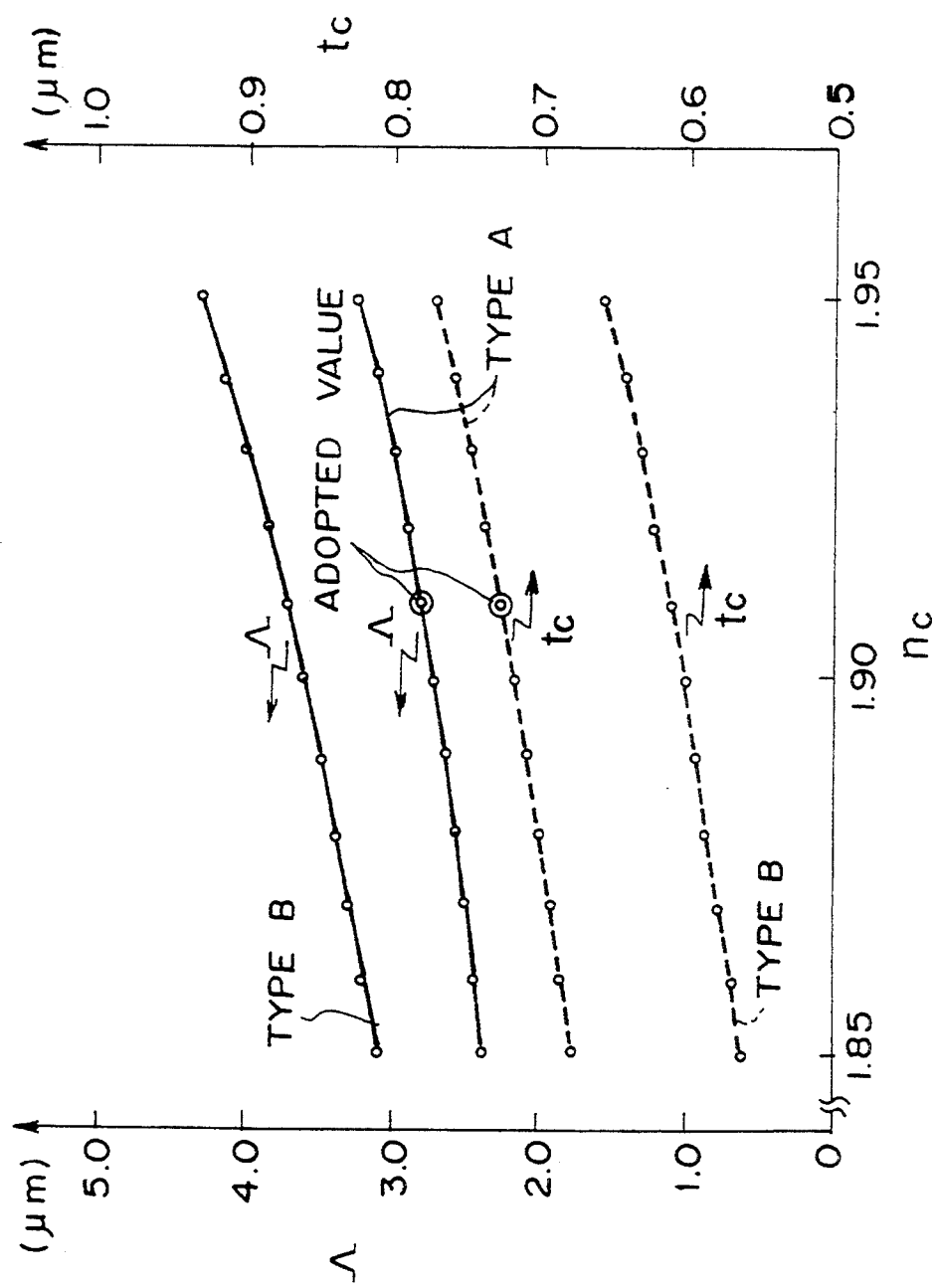
FIG. 4 illustrates an exemplary plot between a refractive index $n_c$ of the cladding layer and the pitch of a grating coupler together with the thickness $t_c$ of a cladding layer.

FIG. 3 schematically represents conditions given by the equations using the parameters shown in the table 1. With a consideration of the fact that the coupling of the external wave and the guided wave becomes stronger the greater the refractive index $n_c$ of the cladding layer, then the pitch $\Lambda$ of LGCs, the refractive index $n_c$ of the cladding layer and the thickness $t_c$ of the cladding layer, all of which satisfy the high efficiency conditional equations (2) and (3) in the range of $$1.85 < n_c < 1.95,$$

will be obtained from the above conditions (4) and (5), and FIG. 4 shows results thereof. In the drawing, the type A represents high efficiency conditions given by the equations (2) and (3), in the case where m=1 and m'=2. Meanwhile, the type B represents high efficiency conditions given by the equations (2) and (3), in the case where m=0 and m'=1. As seen from FIG. 3, the relationship between the pitch $\Lambda$ of LGCs and the refractive index $n_c$, under the high efficiency conditions of types A and B, lies in the range which satisfies the conditions of the equations (4) and (5).

In this embodiment, as previously mentioned, the HfO$_2$ sputtered film ($n_c=1.91$ at $\lambda=632.8$ nm) is selected as the cladding layer 15 on the basis of the range of the refractive index $n_c$ of the cladding layer as defined above. High efficiency conditions for this case will be as follows:

TABLE 2

| Refractive Index $n_c$ of cladding layer | Order of interference in cladding layer | | LGC pitch (μm) | Cladding layer thickness $t_c$ (μm) |
|---|---|---|---|---|
| | m | m' type | | |
| 1.91 | 1 | 2 A | 2.82 | 0.73 |
| | 0 | 1 B | 3.72 | 0.61 |

Among the conditions set forth in the above, the operation and effect of the type-A conditions will be described. Simulated results of the type A conditions are shown in the drawing. This simulation is analyzed using the space-harmonic expansion technique on the basis of Floquet's theorem, thereby obtaining the minus first-order diffraction efficiency P$_1$, the minus second-order diffraction efficiency P$_2$, the minus third-order diffraction efficiency P$_3$, and the radiation loss coefficient $\alpha$.

(a) Dependency on the thickness of cladding layer

Figure 5:
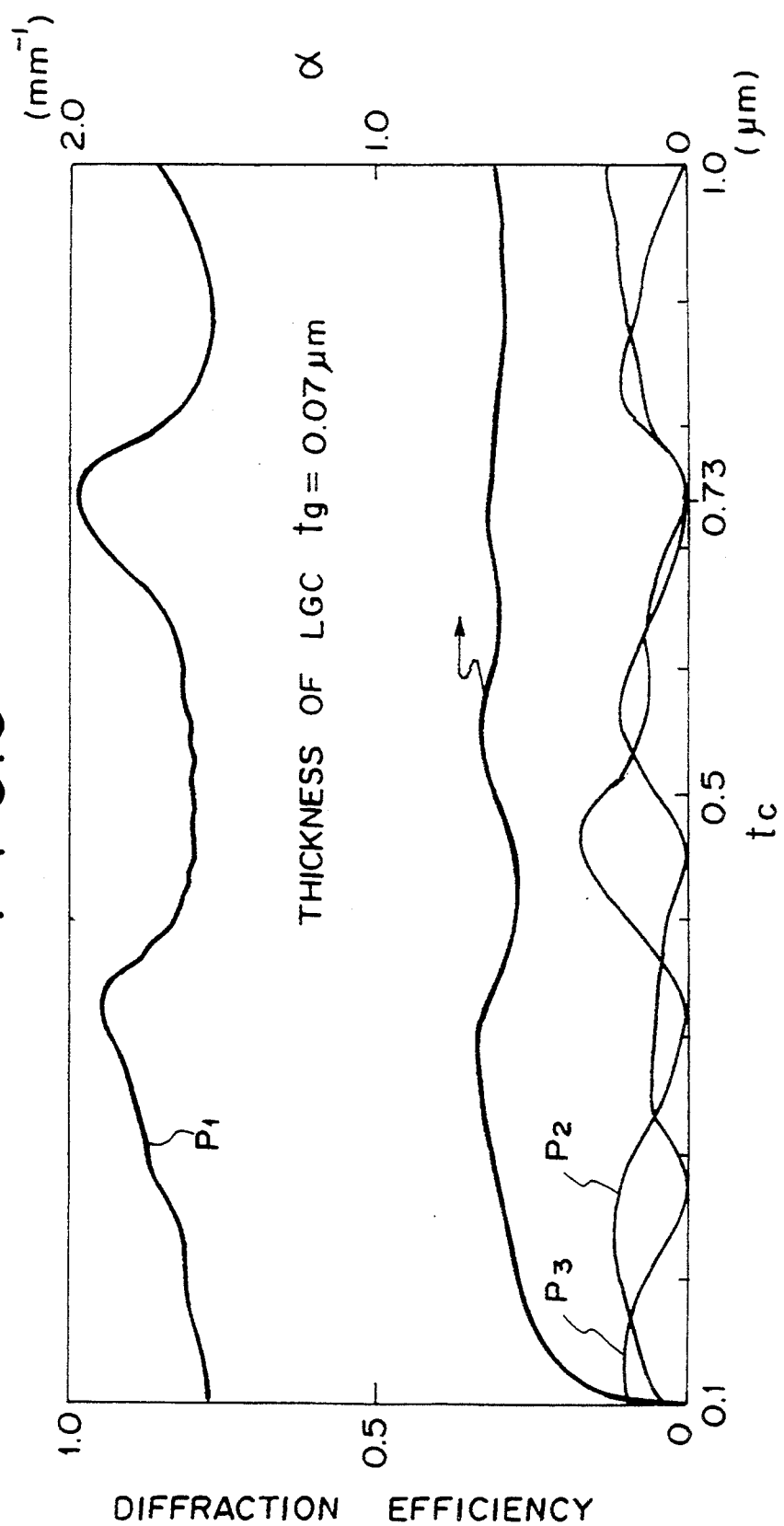
FIG. 5 illustrates an exemplary plot between the refractive index $n_c$ of a cladding layer and a minus first-order diffraction efficiency $P_1$ with a radiation loss coefficient $\alpha$.

FIG. 5 illustrates results of the simulation concerning the dependency, on the thickness $t_c$ of the cladding layer, of the minus first-order diffraction efficiency P$_1$, the minus second-order diffraction efficiency P$_2$, the minus third-order diffraction efficiency P$_3$, and the radiation loss coefficient $\alpha$. In the case of the type A conditions where the thickness $t_c$ of the cladding layer is 0.73 μm, there are observed, as shown in FIG. 5, a considerable drop in both the minus second-order diffraction efficiency P$_2$ and the minus third-order diffraction efficiency P$_3$ and a peak, up to about 99%, in the minus first-order diffraction efficiency P$_1$. Thus, it is confirmed that the high efficiency conditions set forth in the above function properly.

(b) Dependency on the pitch-to-line width ratio of LGC

Figure 6:
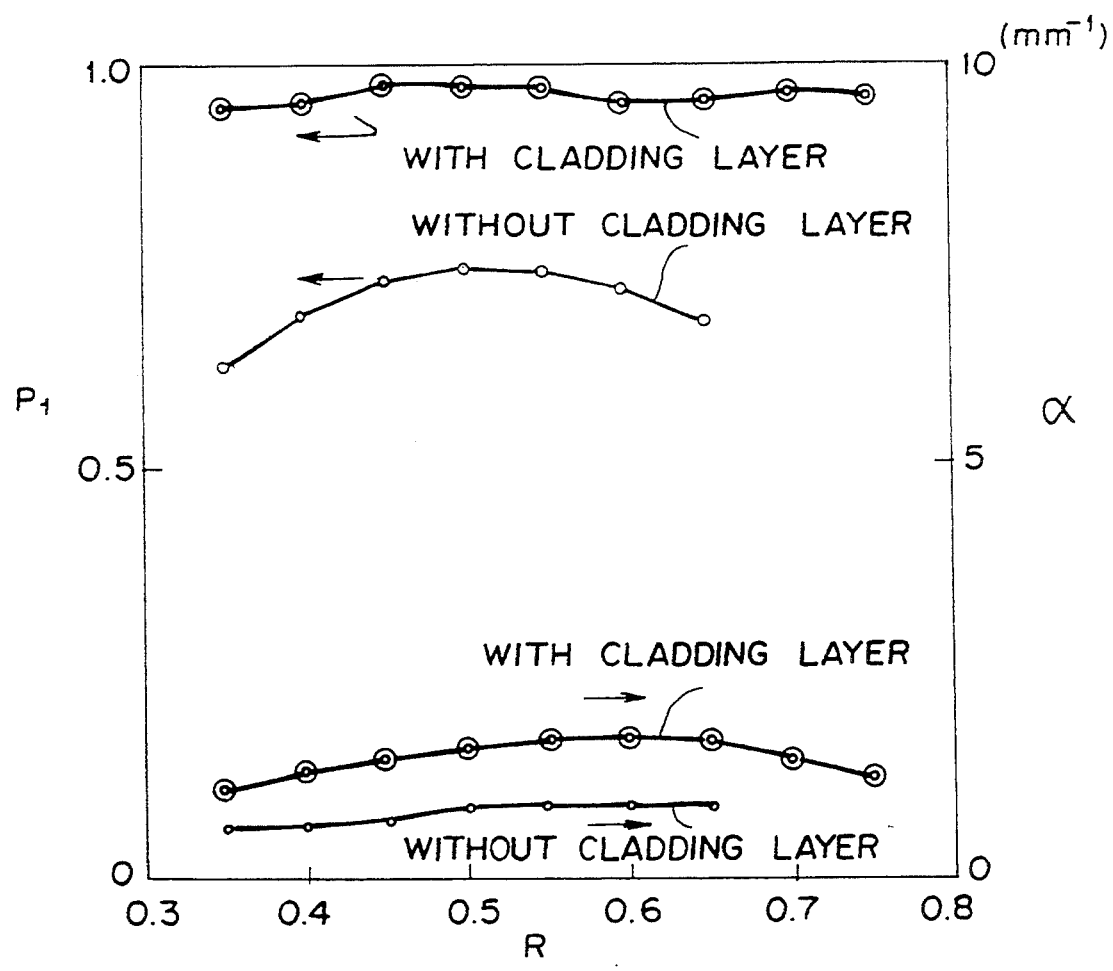
FIG. 6 illustrates an exemplary plot between the pitch-to-line width ratio R of a grating coupler and a minus first-order diffraction efficiency $P_1$ together with a radiation loss coefficient $\alpha$.

FIG. 6 illustrates results of the simulation regarding the dependency, on the pitch-to-line width ratio R of LGC, of the minus first-order diffraction efficiency P$_1$ and the radiation loss coefficient $\alpha$, wherein the pitch of LGC=line width+space. As shown in FIG. 6, the minus first-order diffraction efficiency P₁, at a high level, is ensured independently of variations in the pitch-to-line width ratio R in the range of 0.35 to 0.65. As has been described, this can be attributed to the suppression of a high even order wave, that is, the minus second-order diffracted wave.

(c) Dependency on the thickness of LGC

Figure 7:
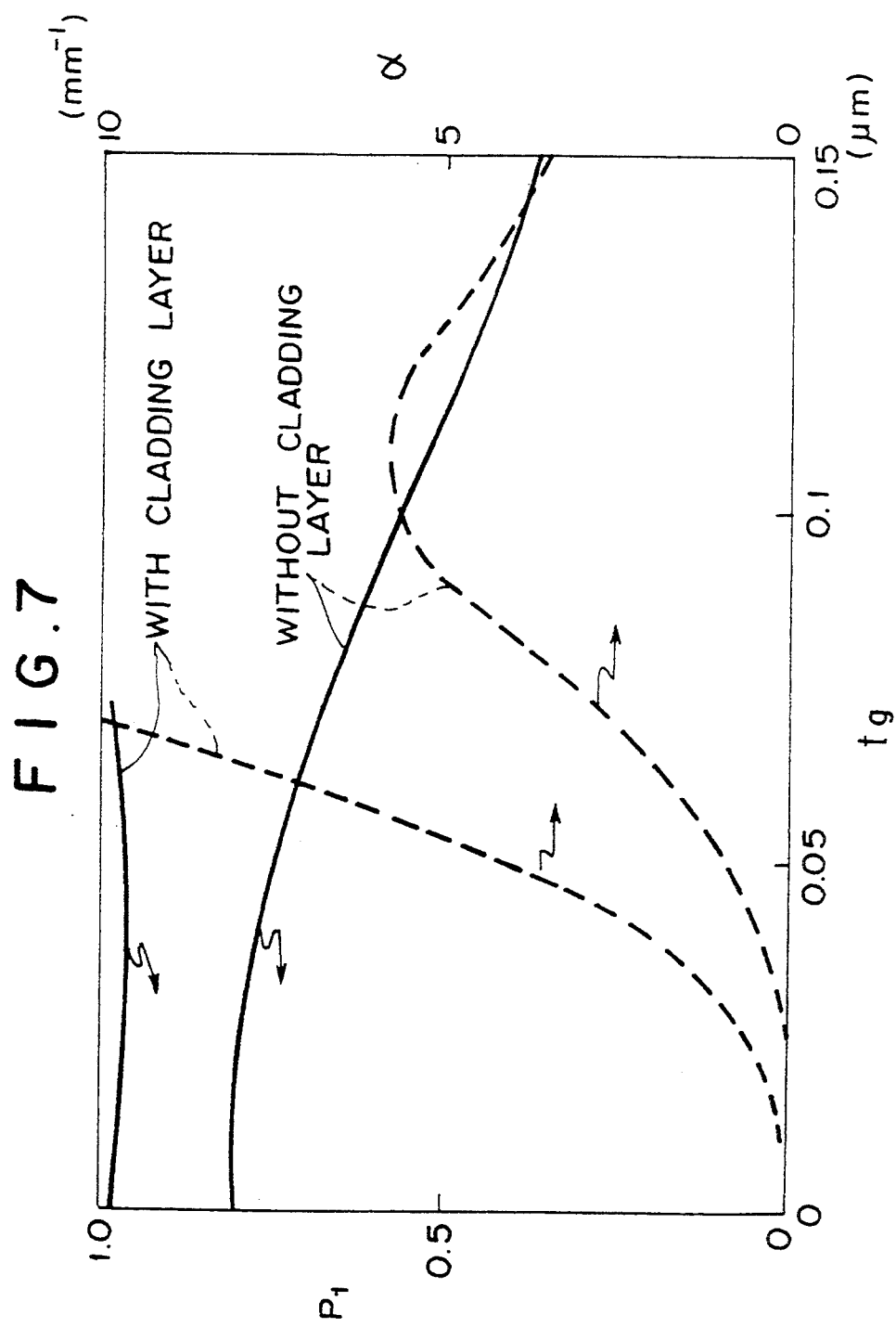
FIG. 7 illustrates an exemplary plot between the height $t_g$ of a grating coupler and a minus first-order diffraction efficiency $P_1$ together with a radiation loss coefficient $\alpha$.

FIG. 7 shows results of the simulation concerning the dependency, on the thickness $t_g$ of the LGC 13, of the minus first-order diffraction efficiency P₁ and the radiation loss coefficient $\alpha$. These simulation results further include the simulation of the optical waveguide device without the cladding layer 15. As is evident from the drawing, the optical waveguide with the cladding layer 15 is improved, in the radiation loss coefficient $\alpha$, by about three times when compared with the optical waveguide device without the cladding layer 15, whereby the coupling of the external wave and the guided wave is strengthened to a greater extent.

Without the cladding layer 15, there occurs a drop in the minus first-order diffraction efficiency P₁ when the thickness of the LGC 13 is increased in order to strengthen the coupling between the external wave and the guided wave. On the contrary, it turns out that the increase in the thickness of the LGC 13 does not lead to such an efficiency drop as is mentioned above when the optical waveguide device is provided with the cladding layer 15. Such a prevention of the efficiency drop enables the emission of incoming and outgoing waves in the form of a Gaussina beam under the control of the height $t_g$ of the LGC 13, as is disclosed in U.S. Pat. No. 5,101,459, without sacrificing the efficiency.

With respect to the actual optical waveguide device shown in FIGS. 1 and 2, measured results of the minus first-order diffraction efficiency P₁ will now be described.

(a) Dependency on the thickness of cladding layer

Figure 8:
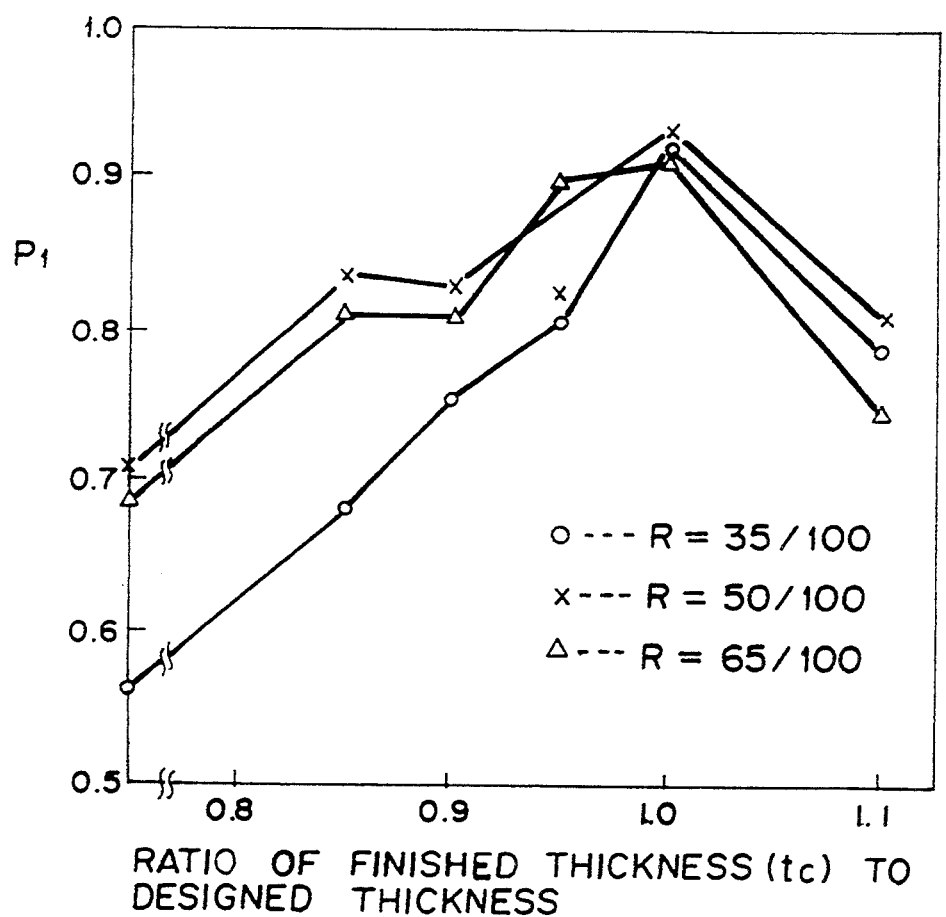
FIG. 8 illustrates an exemplary plot between the height $t_c$ of a cladding layer and a minus first-order diffraction efficiency $P_1$ with respect to three different pitch-to-line width ratios R of grating coupler.

FIG. 8 shows measured results of the relationship between the minus first-order diffraction efficiency P₁ and the thickness $t_c$ of the cladding layer. As seen from the drawing, the minus first-order diffraction efficient P₁ is 94% when the thickness $t_c$ of the cladding layer is set to the optimum value: that is, 0.73 $\mu$m.

(b) Dependency on the pitch-to-line width ratio of LGC

Figure 9:
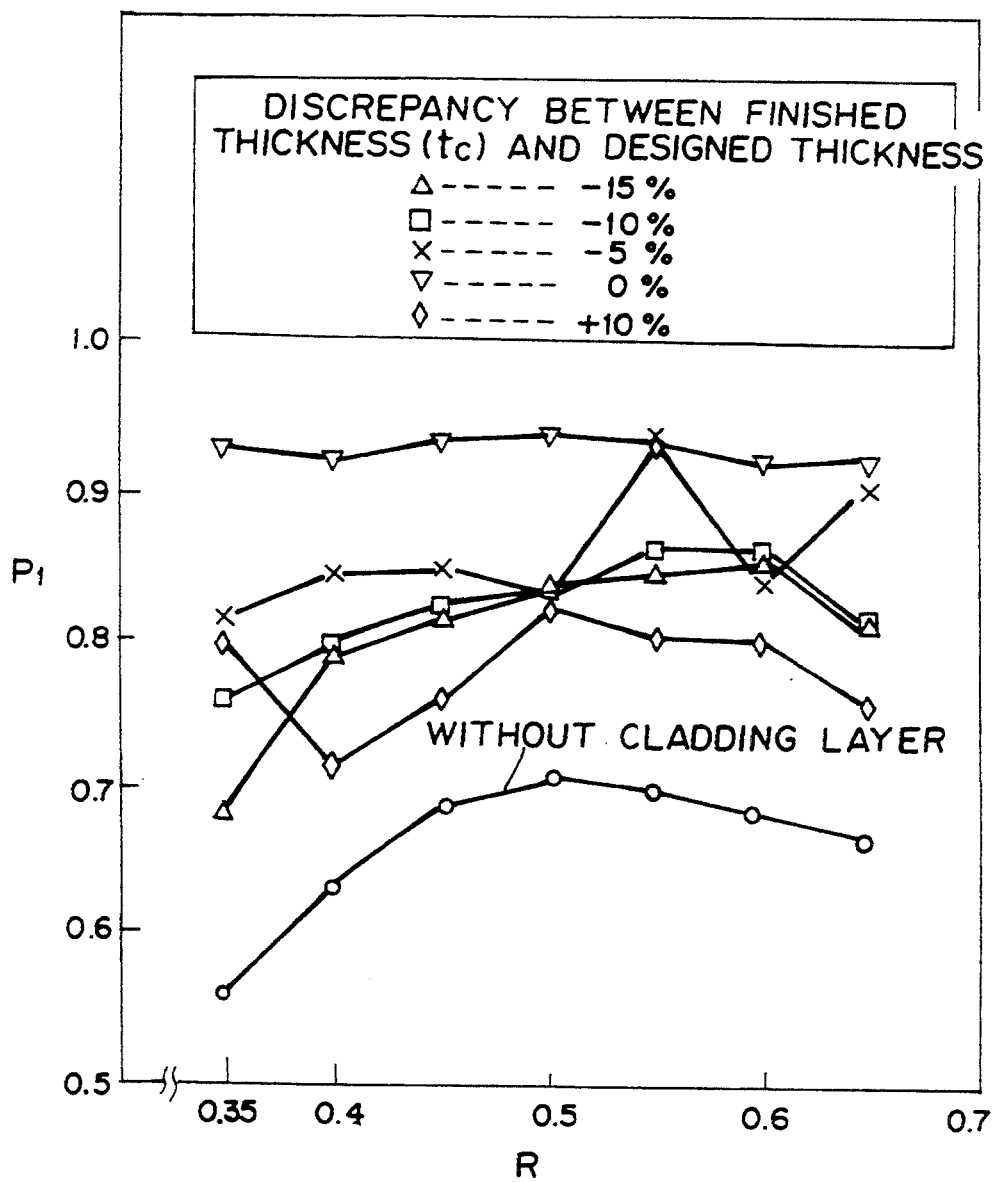
FIG. 9 illustrates an exemplary plot between the pitch-to-line width ratio R of a grating coupler and a minus first-order diffraction efficiency $P_1$ with respect to several discrepancies of the height $t_c$ of a cladding layer between an actual height and a design height.

FIG. 9 illustrates measured results of the relationship between the minus first-order diffraction efficiency and the pitch-to-line width ratio of an LGC. As shown in the drawing, a high level minus first-order diffraction efficiency is ensured, independently of variations in the pitch-to-line width ratio of the LGC in the range from 0.35 to 0.65, when the thickness $t_c$ of the cladding layer is set to 0.73 $\mu$m. These results are in agreement with the foregoing simulation results. In addition, these results exhibit that the variations in the pitch-to-line width ratio of the LGC involve considerable variations in the minus first-order diffraction efficiency P₁.

The LGC 12 will be described. The LGC 12 is fabricated in the same fashion as the LGC 13 and the cladding layer 15. The optical waveguide device is arranged in such a manner that the external wave 20 traces the same optical path as does a minus first-order wave diffracted by the LGC 12 to the substrate 10 if the guided wave 20' travels in a direction reversed to that shown in FIG. 1. As is evident from the reciprocity theorem of electromagnetic fields, such an arrangement leads to a high efficiency in the entrance of a wave into the LGC 12.

The above descriptions are given of the case where the guided wave 20' propagates in a TE mode. In the case where the guided wave 20 is transmitted in a TM mode, the equations (1) and (2) should be respectively modified as such $$\tan \phi_g = n_c^2 \sqrt{(n_c \sin\theta_{c2})^2 - 1} \, / n_c \cos\theta_{c2} \tag{1'}$$

$$\tan \phi_g' = n_c^2 \sqrt{(n_c \sin\theta_{c3})^2 - 1} \, / n_c \cos\theta_{c3} \tag{2'}$$

It may be possible to omit the total reflection of higher order diffracted waves from the boundary surface 15a between the cladding layer 15 and the air, if a high reflection factor of the boundary surface 15a is ensured.

In this case, however, the quantity of phase shifts, being produced when the minus second-order diffracted wave 22a is reflected from the boundary surface 15a, may be zero for the TE mode propagation and a minus $\pi$ for the TM mode propagation instead of the Goos-Hänchen shift $\phi_g$. The cladding layer 15 may be coated with a dielectric multilayered film, instead of being surround by air, so that diffracted waves of higher order can be reflected from the boundary surface 15a.

Figure 10:
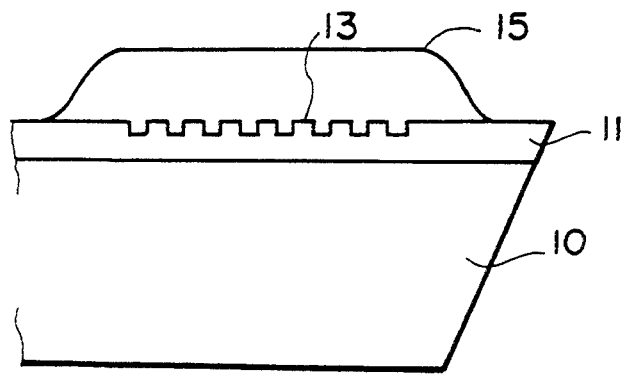
FIG. 10 is a schematic side view showing a grating coupler of another type formed on the surface of the optical waveguide device of this invention.
Figure 11:
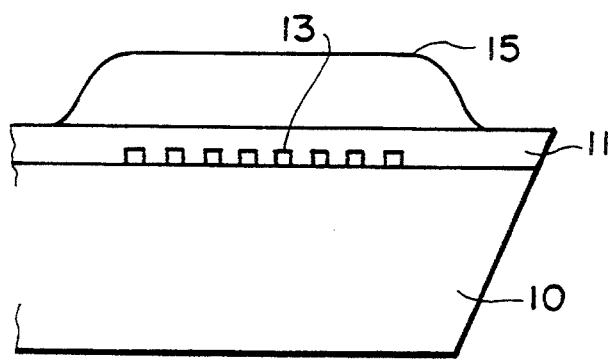
FIG. 11 is a schematic side view showing a grating coupler of another type formed on the bottom surface of the optical waveguide device of this invention.
Figure 12:
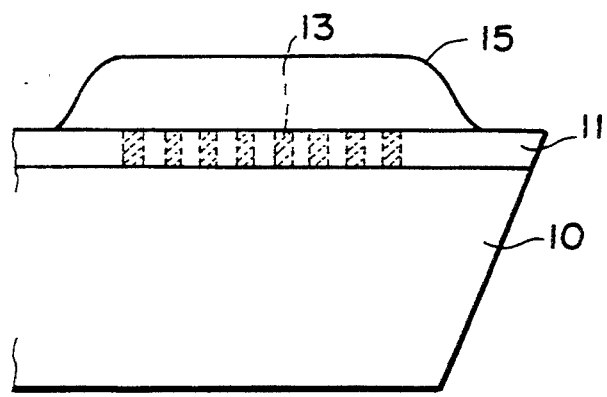
FIG. 12 is a schematic side view showing a grating coupler of another type integrated into the optical waveguide device of this invention.

The rectangularly-raised LGCs 13, which are laid over the surface of the optical waveguide 11, may be modified in such a rectangularly-recessed fashion as shown in FIG. 10. In another preferred mode, the LGCs 13 may be formed inside of the optical waveguide 11 adjacently to the substrate 10 as shown in FIG. 11. And, in a still further preferred mode, the LGCs 13 may be formed with a periodic refractive index change as shown in FIG. 12, and this alternate arrangement may be applicable to the LGCs 12.

One of the foregoing arrangements of the LGCs 13 may sometimes cause the surface of the cladding layer 15 to be uneven in response to the shape of the LGCs 13. However, an uneven cladding layer only results in a nominal drop of about 2% in diffraction efficiency of the minus first-order diffracted wave 21, which may be negligible in practical use.

Further, if the waveguide is designed to satisfy the following relationship, the line width of the grating can be relatively large without adversely affecting efficiency.

$$-m\lambda/(N+n_c)c\Lambda c - m\lambda/N - n_c \tag{6}$$

where
m is an integer representing the order of the wave;
N is the effective refractive index of the waveguide;
$\Lambda$ is the pitch of the grating;
$\lambda$ is the wavelength of the light; and
$n_c$ is the refractive index of the cladding layer.

According to the embodiments of this invention, the thickness of the cladding layer 15 is arranged, at both ends thereof, to be reduced progressively outwards, thereby preventing the guided wave 20' from being scattered when traveling along the optical waveguide 11 in proximity to the end portion of the cladding layer; specifically, the left end portion of the cladding layer shown in FIG. 2. Thus, the propagation loss of the guided wave 20' can be suppressed to a lesser extent.

The embodiments set forth in the above are directed to a two-dimensional optical waveguide, that is, a slab type optical waveguide, but may also be applicable to a three-dimensional optical waveguide. As with the previous embodiments, even in the latter case, a highly efficient entrance/emission of a wave can be effected.

It will be understood that the above description of the present invention is susceptible to various modifications, changes and adaptations and the same are intended to be comprehended within the meaning and range of equivalents of the appended claims.

What is claimed is:

1. An optical waveguide device including a diffraction grating means formed on an optical waveguide which is laid over a transparent substrate and the diffraction grating means being coated with a cladding layer, wherein the optical waveguide, the cladding layer, and the diffraction grating means are arranged in such a manner to define diffracting means for causing a minus first-order wave, where $-m\lambda/N - n_c < \Lambda$, to be diffracted only toward the substrate, while other waves of higher order, which are larger in absolute value than that of the first-order wave, where $-m\lambda/(N+n_c) < \Lambda < -m\lambda/(N-n_c)$, are diffracted both toward the substrate and toward the cladding layer, and said diffracting means causing at least one of the higher order waves, which is first diffracted toward the cladding layer and is subsequently reflected back to the substrate from the boundary of a cladding layer which is furthest from the substrate, to weaken the other diffracted wave of the same order that is initially diffracted to the substrate wherein m is an integer representing the order of the wave;
N is the effective refractive index of the waveguide;
$\Lambda$ is the pitch of the grating;
$\lambda$ is the wavelength of the light, and
$n_c$ is the refractive index of the cladding layer.

2. An optical waveguide device as defined in claim 1, wherein the optical waveguide is arranged in such a manner to define a guide means for guiding an external wave which is reversed in direction, to trace the same optical path as does a minus first-order wave diffracted only toward the substrate, and in such a manner that the external wave is introduced into the optical waveguide after being diffracted by the diffraction grating means as defined in claim 1.

3. An optical waveguide device as defined in claim 2, wherein the waves of high order, whose diffracted waves of the same order weaken each other, include at least one of a minus second order wave ($m = -2$) and a minus third-order wave ($m = -3$).

4. An optical waveguide device as defined in claim 2, wherein the waves of high order, whose diffracted waves of the same order weaken each other, include diffracted waves of higher even order wherein m is an even number and $m \leq -2$.

5. An optical waveguide device as defined in claim 1, wherein the waves of high order, whose diffracted waves of the same order weaken each other, include at least one of a minus second order wave ($m = -2$) and a minus third-order wave ($m = -3$).

6. An optical waveguide device as defined in claim 5 wherein the waves of high order, whose diffracted waves of the same order weaken each other, include diffracted waves of higher even order.

7. An optical waveguide device as defined in claim 1, wherein the waves of high order, whose diffracted waves of the same order weaken each other, include diffracted waves of higher even order wherein m is an even number and $m \leq -2$.

8. An optical waveguide device including a diffraction grating means formed on an optical waveguide which is laid over a transparent substrate and a cladding layer being superimposed on the diffraction grating means, wherein the optical waveguide, the cladding layer, and the diffraction grating means are arranged in such a manner to define diffracting means for causing a minus first-order wave, where $-m\lambda/N - n_c < \Lambda$, to be diffracted only toward the substrate, while other waves of higher order, which are larger in absolute value than that of the first-order wave, where $-m\lambda(N+n_c) < \Lambda < -m\lambda/(N-n_c)$, are diffracted both toward the substrate and toward the cladding layer, said diffracting means causing at least one of the diffracted higher order waves, which is first diffracted toward the cladding layer and is subsequently reflected back to the substrate from a cladding layer boundary which is furthest from the substrate, to weaken the other diffracted waves of the same order that is initially diffracted to the substrate, and the optical waveguide is arranged in such a manner that if an external wave is reversed in direction, the external wave traces the same optical path as does the minus first-order wave diffracted only toward the substrate, and that the external wave is introduced into the optical waveguide after being diffracted by the diffraction grating means wherein m is an integer representing the order of the wave;
N is the effective refractive index of the waveguide;
$\Lambda$ is the pitch of the grating;
$\lambda$ is the wavelength of the light, and
$n_c$ is the refractive index of the cladding layer.

9. An optical waveguide device as defined in claim 8, wherein the waves of high order, whose diffracted waves of the same order weaken each other, include at least one of a minus second order wave ($m = -2$) and a minus third-order wave ($m = -3$).

10. An optical waveguide device as defined in claim 8, wherein the waves of high order, whose diffracted waves of the same order weaken each other, include diffracted waves of higher even order wherein m is an even number and $m \leq 2$.

* * * * *